(12) United States Patent
Sawada

(10) Patent No.: US 6,673,619 B2
(45) Date of Patent: Jan. 6, 2004

(54) CATALYST DETERIORATION DETECTING DEVICE AND CATALYST DETERIORATION DETECTING METHOD

(75) Inventor: Hiroshi Sawada, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 35 days.

(21) Appl. No.: 09/863,446

(22) Filed: May 24, 2001

(65) Prior Publication Data
US 2002/0148217 A1 Oct. 17, 2002

(30) Foreign Application Priority Data
Jun. 1, 2000 (JP) ......................... 2000-164923

(51) Int. Cl.⁷ ................... G01N 31/10; G01N 27/00; F01N 3/00
(52) U.S. Cl. ............... 436/37; 60/274; 60/277; 422/98; 422/108; 436/137; 436/149; 436/155; 436/159; 436/181
(58) Field of Search ............. 432/98, 108; 60/274–277; 436/37, 137, 149, 155, 159, 181

(56) References Cited

U.S. PATENT DOCUMENTS

| | | | |
|---|---|---|---|
| 5,157,921 A * | 10/1992 | Ito et al. | 60/274 |
| 5,379,587 A * | 1/1995 | Toyoda | 60/276 |
| 5,545,377 A * | 8/1996 | Fukaya et al. | 422/108 |
| 5,684,248 A * | 11/1997 | Iwata | 73/118.1 |
| 5,724,809 A * | 3/1998 | Mitsutani et al. | 60/276 |
| 5,732,553 A * | 3/1998 | Mitsutani | 60/276 |
| 5,737,916 A * | 4/1998 | Mitsutani | 60/276 |
| 5,822,982 A * | 10/1998 | Mitsutani | 60/276 |
| 5,848,527 A * | 12/1998 | Mitsutani | 60/274 |
| 5,851,376 A * | 12/1998 | Nishioka et al. | 205/784.5 |
| 5,887,421 A * | 3/1999 | Mitsutani | 60/274 |
| 6,145,304 A * | 11/2000 | Takahashi et al. | 60/277 |
| 6,195,986 B1 * | 3/2001 | Davey et al. | 60/274 |

FOREIGN PATENT DOCUMENTS

| | | | |
|---|---|---|---|
| JP | 63-231252 | * | 9/1988 |
| JP | A 5-163989 | | 6/1993 |
| JP | 5-196588 | * | 8/1993 |
| JP | 6-74926 | * | 3/1994 |
| JP | A 9-41949 | | 2/1997 |
| JP | A 10-54226 | | 2/1998 |
| JP | A 10-121943 | | 5/1998 |

* cited by examiner

*Primary Examiner*—Arlen Soderquist
(74) *Attorney, Agent, or Firm*—Oliff & Berridge, PLC (57) ABSTRACT

A catalyst deterioration detecting device of the invention has exhaust emission purifying catalyst on an exhaust passage of an internal combustion engine and air-fuel ratio sensors provided upstream and downstream of the exhaust emission purifying catalyst, respectively, and detects the deterioration of the exhaust emission purifying catalyst based on the outputs of the air-fuel ratio sensors. An index characteristic value of catalyst deterioration is calculated from the outputs of the air-fuel ratio sensors, a time-lapse changing ratio of the calculated index characteristic value of catalyst deterioration is calculated, and the deterioration of the exhaust emission purifying catalyst is determined based on the calculated time-lapse changing ratio.

12 Claims, 5 Drawing Sheets

CATALYST DETERIORATION DETECTING DEVICE AND CATALYST DETERIORATION DETECTING METHOD

INCORPORATION BY REFERENCE

The disclosure of Japanese Patent Application No. 2000-164923 filed on Jun. 1, 2001 including the specification and abstract is incorporated herein by reference in its entirety.

BACKGROUND OF THE INVENTION

1. Field of the Invention

The invention relates to a catalyst deterioration detecting device and a catalyst deterioration detecting method for detecting the deterioration of exhaust emission purifying catalyst arranged on an exhaust passage of an internal combustion engine.

2. Description of Related Art

Exhaust emission purifying catalyst (hereinafter, also simply referred to as catalyst) for purifying unburned fuel, carbon monoxide, nitrogen oxide or the like in the exhaust gas is attached to an exhaust passage of an internal combustion engine mounted in a vehicle. Also, a catalyst deterioration detecting device to determine a deteriorating state of the catalyst is also concomitantly installed to the internal combustion engine in order to prevent an increase in an emission amount of unpurified components into the atmosphere due to the deterioration of the catalyst. As such a catalyst deterioration detecting device, one described in Japanese Patent Laid-Open Publication No. Hei 5-163989 etc. is known. The catalyst deterioration detecting device described in this publication has air-fuel ratio sensors upstream and downstream of an exhaust emission purifying catalyst, respectively, and detects the deterioration of the catalyst based on the outputs of these air-fuel ratio sensors.

In the invention according to the above-mentioned publication, however, the determination of the deterioration of the catalyst was carried out by simply comparing an index characteristic value of catalyst deterioration (specifically, a locus length ratio or an area ratio) derived from the outputs of the pair of air-fuel ratio sensors at a certain time point and a reference value for comparison. However, with various deterioration forms of catalyst, there are possibilities that all these various forms cannot be positively detected by the above-mentioned method. Therefore, development of a catalyst deterioration detecting device capable of performing more advanced determination of the deterioration of the catalyst has been wanted.

SUMMARY OF THE INVENTION

It is an object of the invention to provide a catalyst deterioration detecting device and a catalyst deterioration detecting method capable of detecting the deterioration of exhaust emission purifying catalyst more positively and in an earlier period of time, regardless of form of deterioration.

In order to achieve the object, the first form of the invention comprises exhaust emission purifying catalyst on an exhaust passage of an internal combustion engine, and at the same time air-fuel ratio sensors provided at upstream and downstream of the exhaust emission purifying catalyst, respectively, wherein deterioration of the exhaust emission purifying catalyst is detected based on the outputs of the air-fuel ratio sensors. At that time, an index characteristic value of catalyst deterioration is calculated from the outputs of the air-fuel ratio detecting means, a time-lapse changing ratio of the index characteristic value of catalyst deterioration is calculated, and the deterioration of the exhaust emission purifying catalyst is thereby determined based on the time-lapse changing ratio.

According to the invention, the deterioration of the exhaust emission purifying catalyst is determined based on the time-lapse changing ratio of the index characteristic value of catalyst deterioration; therefore, it is possible to detect the deterioration of the exhaust emission purifying catalyst more precisely corresponding to various deterioration forms of the exhaust emission purifying catalyst. Since the deterioration of the exhaust emission purifying catalyst is determined at this time based on the time-lapse changing ratio of the index characteristic value of catalyst deterioration, it is possible to detect the deterioration in an earlier period of time and further suppress the emission of hazardous substances into the atmosphere.

When the time-lapse changing ratio is calculated, the calculation is desirably based on population shifted along the time-series. With this calculation, even in a case where an abnormality index characteristic value of catalyst deterioration is indicated sporadically without having a deterioration state of the exhaust emission purifying catalyst, it is possible to prevent the exhaust emission purifying catalyst from being incorrectly determined as deteriorating and further precisely carry out the detection.

DETAILED DESCRIPTION OF PREFERRED EMBODIMENTS

Figure 1:
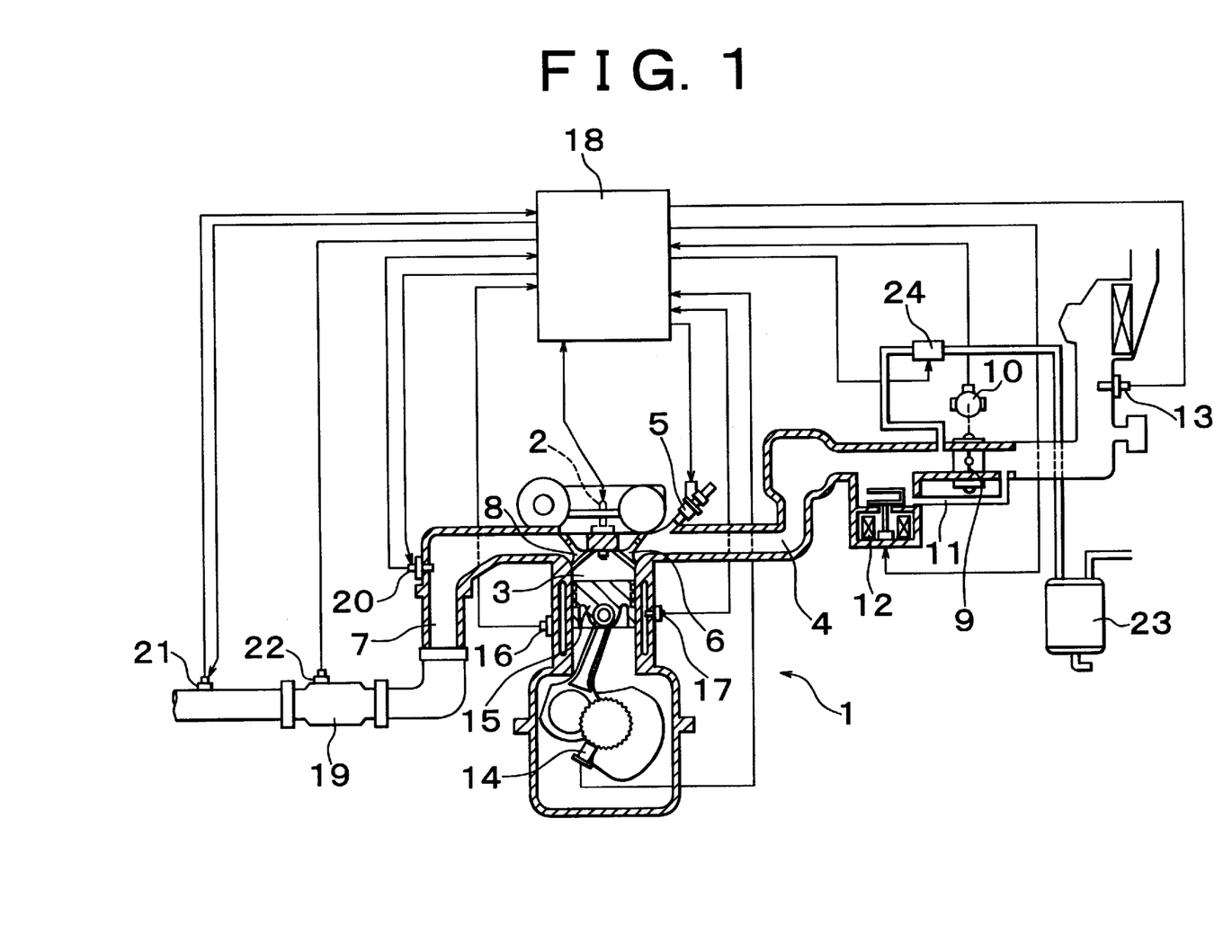
FIG. 1 is a sectional view showing an internal combustion engine having an embodiment of a catalyst deterioration detecting device of the invention.

Hereinafter, an embodiment of a catalyst deterioration detecting device of the invention will be explained with reference to drawings. FIG. 1 is a view showing a constitution of an internal combustion engine having a detecting device of the embodiment.

An engine 1 as shown in FIG. 1 generates driving force by igniting air-fuel mixture within each cylinder 3 by an ignition plug 2. In combustion of the engine 1, air taken in from the outside passes an intake passage 4, is mixed with fuel injected from an injector 5, and is then taken in the cylinder 3 as air-fuel mixture. Opening and closing between the inside of the cylinder 3 and the intake passage 4 are carried out by an intake valve 6. The air-fuel mixture burned within the cylinder 3 is emitted to an exhaust passage 7 as exhaust gas. Opening and closing between the inside of the cylinder 3 and the exhaust passage 7 are carried out by an exhaust valve 8.

A throttle valve 9 for adjusting an amount of the intake air to be taken in the cylinder 3 is arranged on the intake passage 4. The throttle valve 9 is connected to a throttle position sensor 10, which detects the throttle valve opening.

Moreover, an air bypass valve 12 for adjusting an amount of the intake air supplied to the cylinder 3 through a bypass passage 11 during idling (when the throttle valve 9 is fully closed) is arranged on the intake passage 4. Further, an air flow meter 13 for detecting an amount of the intake air is attached on the intake passage 4.

A crank position sensor 14 for detecting the position of a crankshaft is attached near the crankshaft of the engine 1. The position of a piston 15 within the cylinder 3 and the engine speed can be derived also from the output of the crank position sensor 14. Moreover, a knock sensor 16 which detects knocking of the engine 1 and a water temperature sensor 17 which detects a temperature of the cooling water are also attached to the engine 1. The exhaust gas from the cylinder 3 is emitted into the atmosphere after being purified by exhaust emission purifying catalyst 19 on the exhaust passage 7. An upstream side air-fuel ratio sensor 20 is installed upstream of the exhaust emission purifying catalyst 19, and a downstream side air-fuel ratio sensor 21 is installed downstream of the exhaust emission purifying catalyst 19.

The ignition plug 2, the injector 5, the throttle position sensor 10, the air bypass valve 12, the air flow meter 13, the crank position sensor 14, the knock sensor 16, the water temperature sensor 17 and other sensors, are connected with an electronic control unit (ECU) 18 controlling the engine 1 in total and are controlled based on a signal from the ECU 18, or forward detected results to the ECU 18. A catalyst temperature sensor 22 for measuring a temperature of the exhaust emission purifying catalyst 19 which is arranged on the exhaust passage 7 and a purge control valve 24 to purge vaporized fuel collected within a fuel tank by a charcoal canister 23 to the intake passage 4 are also connected to the ECU 18.

Moreover, the above-mentioned upstream side air-fuel ratio sensor 20 and the downstream side air-fuel ratio sensor 21 are connected to the ECU 18. In this embodiment, the pair of air-fuel ratio sensors 20, 21 are oxygen concentration sensors with which an exhaust emission air-fuel ratio is detected from the oxygen concentrations in exhaust gas at the attached positions. The air-fuel ratio sensors 20, 21 can not perform a precise detection without being over a predetermined temperature (activation temperature); therefore, the temperature thereof is increased by power supplied from the ECU 18 so as to increase the temperature up to the activation temperature in an early period of time.

The ECU 18 has internally a CPU to perform calculation, a RAM to store various information such as the calculated results, a back-up RAM where such memory content is maintained by a battery, a ROM where each control program is saved, or the like. The ECU 18 controls the engine 1 based on an air-fuel ratio. Moreover, the ECU 18 calculates an amount of injection to be injected by the injector 5 and also carries out the determination of the deterioration of the exhaust emission purifying catalyst 19.

In this embodiment, the deterioration of the exhaust emission purifying catalyst 19 is determined based on an index characteristic value of catalyst deterioration calculated from the outputs of the pair of air-fuel ratio sensors 20, 21. Next, the index characteristic value of catalyst deterioration to be used in this embodiment will be briefly explained.

Figure 2A:
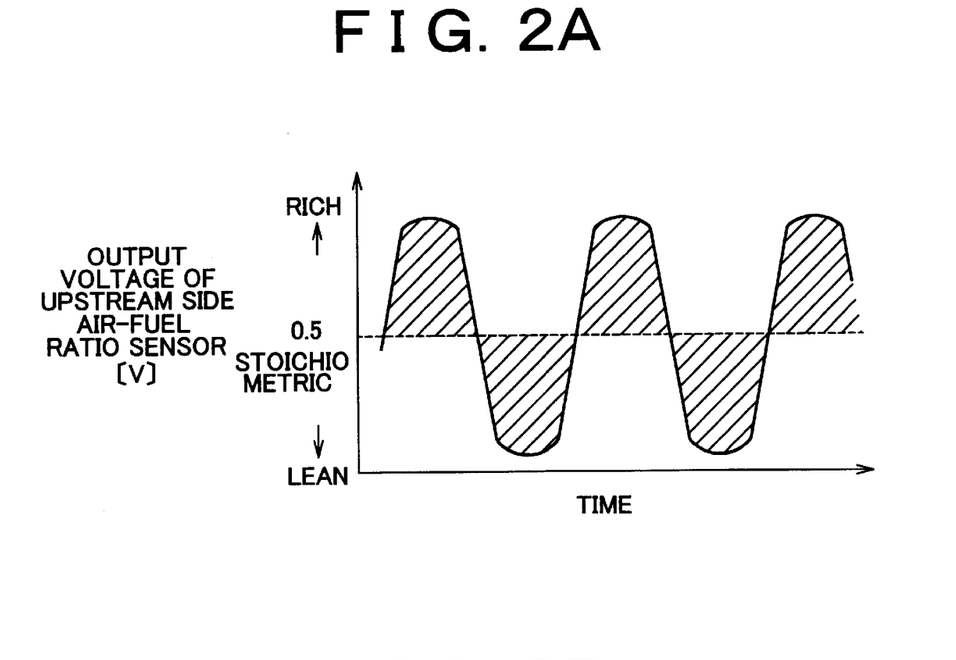
FIG. 2(A) and FIG. 2(B) are graphs showing examples of output waveforms of air-fuel ratio sensors.
Figure 2B:
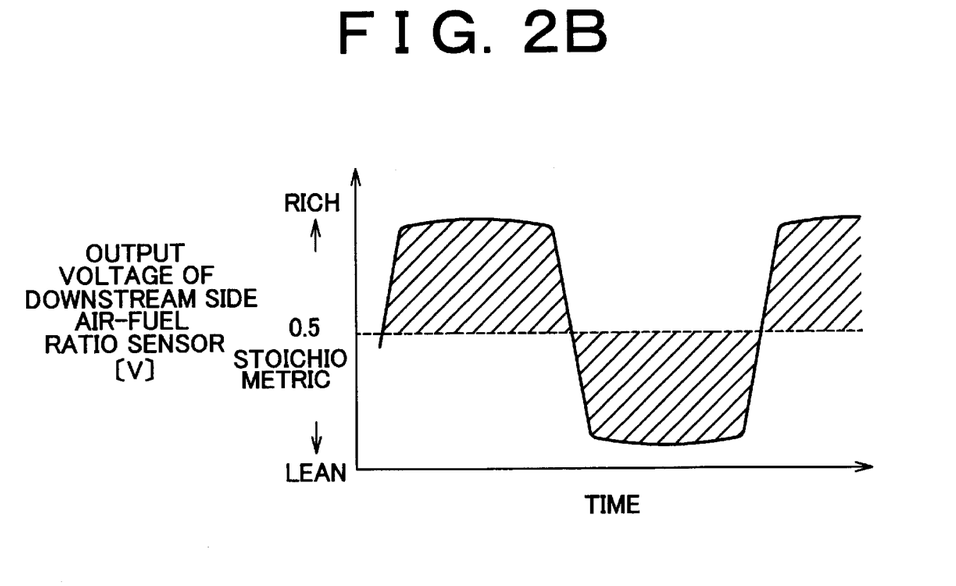

In this embodiment, as an index characteristic value of catalyst deterioration, so-called a locus length ratio is used. A method for calculating the locus length ratio is schematically illustrated in FIG. 2. The output of the upstream side air-fuel ratio sensor 20 under air-fuel feedback control with the exhaust emission purifying catalyst 19 in the normal state is shown in FIG. 2A, and the output of the downstream side air-fuel ratio sensor 21 are shown in FIG. 2B. When the exhaust emission purifying catalyst 19 is in the normal state, a changing frequency of the output of the downstream side air-fuel ratio sensor 21 (that is, the exhaust emission air-fuel ratio of the gas flowing out of the exhaust emission purifying catalyst 19) becomes lower with respect to a changing frequency of the output of the upstream side air-fuel ratio sensor 20 (that is, the exhaust emission air-fuel ratio of the gas flowing into the exhaust emission purifying catalyst 19) as shown in FIG. 2A and FIG. 2B.

However, as the deterioration of the exhaust emission purifying catalyst 19 proceeds, the changing frequency of the output of the downstream side air-fuel ratio sensor 21 becomes closer to the changing frequency of the output of the upstream side air-fuel ratio sensor 20. Here, the deterioration of the exhaust emission purifying catalyst 19 is determined by utilizing this phenomenon. Therefore, the locus length ratio is used as an index characteristic value of catalyst deterioration, and the locus length ratio is a value expressed by (a length of an output waveform of the downstream side air-fuel ratio sensor 21:locus length)/(a length of an output waveform of the upstream side air-fuel ratio sensor 20: locus length). That is, as the exhaust emission purifying catalyst 19 deteriorates, the locus length of the downstream side air-fuel ratio sensor 21 becomes longer; therefore, the locus length ratio becomes larger. Conventionally, the determination of the deterioration was carried out by simply comparing a locus length ratio and a predetermined reference value; however, the determination of the deterioration is carried out using a time-lapse changing ratio of the locus length ratio (index characteristic value of catalyst deterioration) in this embodiment.

Incidentally, although the locus length ratio is used as an index characteristic value of catalyst deterioration in this embodiment, there are an area ratio or a frequency ratio, etc., as index characteristic values of catalyst deterioration to be calculated from the outputs of the air-fuel ratio sensors and these may be employed. Moreover, the determination may be carried out in combination of the locus length ratio, the area ratio, the frequency ratio, and so on. Incidentally, the area ratio is a value expressed by (an area obtained from an output waveform of the downstream side air-fuel ratio sensor 21)/(an area obtained from an output waveform of the upstream side air-fuel ratio sensor 20) associated with the shaded areas shown in FIG. 2(A) and FIG. 2(B). And the frequency ratio is a value expressed by (a frequency of an output waveform of the downstream side air-fuel ratio sensor 21)/(a frequency of an output waveform of the upstream side air-fuel ratio sensor 20).

Figure 3:
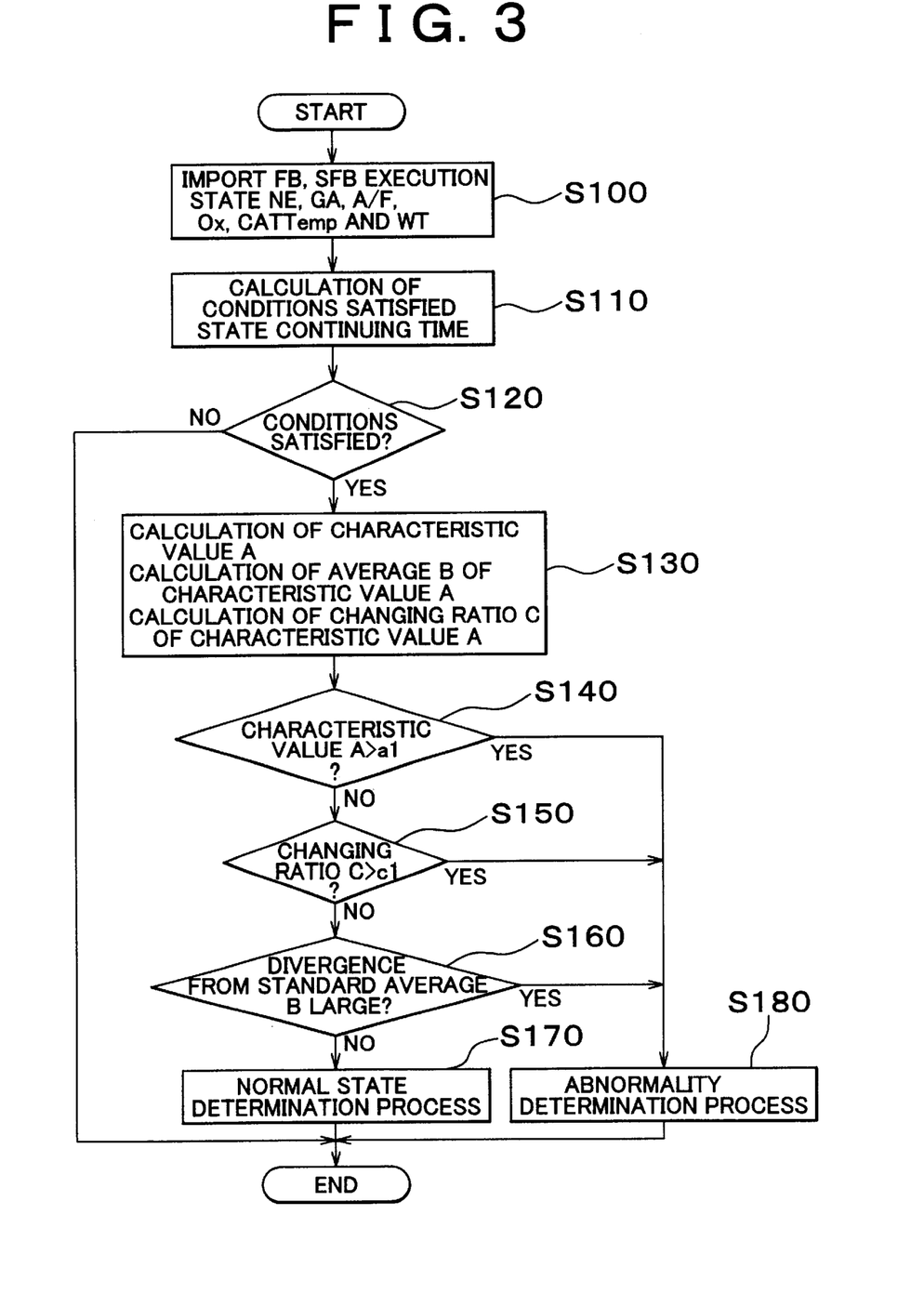
FIG. 3 is a flowchart showing control of detecting deterioration according to an embodiment of the catalyst deterioration detecting device of the invention.

Next, deterioration detection control with a deterioration detecting device of this embodiment will be explained. The flowchart of this control is shown in FIG. 3.

Firstly, an executed state of air-fuel ratio feedback (FB) control based on the output of the upstream side air-fuel ratio sensor 20 and an executed state of sub-air-fuel ratio feedback (SFB) control based on the output of the downstream side air-fuel ratio sensor 21, an engine speed NE to be detected by the crank position sensor 14, an intake air amount GA to be detected by the air flow meter 13, an exhaust emission air-fuel ratio A/F to be detected by the air-fuel ratio sensors 20, 21, an oxygen sensor output Ox, a temperature of the exhaust emission purifying catalyst 19 CATTemp to be detected by the catalyst temperature sensor 22, an opening WT of the throttle valve 9 to be detected by the throttle position sensor 10, and so on are read in (step 100).

It is judged whether conditions for calculation of an index characteristic value of catalyst deterioration (hereinafter, also simply referred to characteristic value) are satisfied or unsatisfied based on such various amounts of state, and the continuous time when the conditions are satisfied is derived (step 110) wherein the judgement is made also based on this continuous time as one of the execution conditions. That is because the continuous time exceeding a certain time means that the execution conditions are stable and the determination of the catalyst deterioration can be precisely carried out. From both of the execution conditions based on the above-mentioned various amounts of state and the execution condition based on the continuous time of these execution conditions, the final determination whether the execution conditions are satisfied or not is made (step 120). If not satisfied at step 120, the determination of the deterioration of the exhaust emission purifying catalyst 19 is not carried out.

If satisfied in step 120, a characteristic value A (index characteristic value of catalyst deterioration), an average B of the characteristic values A, and a changing ratio C of the characteristic value A (time-lapse changing ratio) are calculated (step 130). The above-mentioned locus length ratio per predetermined time is calculated based on the outputs of the air-fuel ratio sensors 20, 21. The locus length ratio is calculated per around 3 to 50 seconds, in this case it is calculated per 50 seconds. One locus length ratio is calculated with the output variations of the air-fuel ratio sensors 20, 21 during 50 seconds here. Moreover, 50 seconds for calculating one lotus length ratio is not necessarily continuing, but may be intermitted due to some reasons (such as intermittence of the air-fuel ratio feedback control) as long as the period to be a base of the calculation is 50 seconds.

Thus, the locus length ratios calculated per predetermined time are to be $a_1, a_{i+1}, a_{i+2} \ldots$. And an average of the locus length ratios over predetermined number of times is calculated as the characteristic value A. The characteristic value A is calculated as the average of the locus length ratio over about 3 to 5 times, in this case calculated as the average of 3 times.

$$Ai = \frac{a_i + a_{i+2} + a_{i+2}}{3}, A_{i+4} = \frac{a_{i+4} + a_{i+5} + a_{i+6}}{3}, \cdots, \quad (1)$$

$$A_{i+4n} = \frac{a_{i+4n} + a_{i+4n+1} + a_{i+4n+2}}{3}, \cdots, (n = 0, 1, 2, \cdots)$$

Further, an average of such obtained characteristic values A over a predetermined number of times is calculated as an average B. The average B is calculated as an average of the characteristic values A over around 50 to 300 times, in this case, calculated as an average of 50 times.

$$B_i = \frac{A_i + A_{i+4} + \cdots + A_{i+4\cdot49}}{50}, \quad (2)$$

$$B_{i+4\cdot50} = \frac{A_{i+4\cdot50} + A_{i+4\cdot51} + \cdots + A_{i+4\cdot99}}{50}, \cdots,$$

$$B_{i+4\cdot50m} = \frac{A_{i+4\cdot50m} + \cdots + A_{i+4\cdot(50m+49)}}{50}, \cdots, (m = 0, 1, 2, \cdots)$$

Further, a difference ΔA of the characteristic value A per unit time is derived.

$$\Delta A_1 = A_i - A_{1-4}$$

$$\Delta A_{1+4} = A_{1+4} - A_1$$

$$\Delta A_{1+4n} = A_{1+4n} - A_{1+4\,(n-1)} \quad (3)$$

$$(n = 0, 1, 2, \ldots)$$

And, an average of the differences ΔA over a predetermined number of times is calculated as a changing ratio C of the characteristic value A, in this case, an average of the differences ΔA over 20 times is calculated as the changing ratio C.

$$C_i = \frac{\Delta A_i + \Delta A_{i+4} + \cdots + \Delta A_{i+4\cdot19}}{20}, \quad (4)$$

$$C_{i+4\cdot20} = \frac{\Delta A_{i+4\cdot20} + \Delta A_{i+4\cdot21} + \cdots + \Delta A_{i+4\cdot39}}{20}, \cdots,$$

$$C_{i+4\cdot20l} = \frac{\Delta A_{i+4\cdot20l} + \cdots + \Delta A_{i+4\cdot(20l+19)}}{20}, \cdots (l = 0, 1, 2, \cdots)$$

Incidentally, in the above-mentioned calculation, the next value to the characteristic value $A_i$ a characteristic value $A_{1+4}$. In such a way, a space of a buffer to store the characteristic values A at the time of control can be desirably reduced; however, the following may be used.

$$A_i = \frac{a_i + a_{i+2} + a_{i+3}}{3}, A_{i+1} = \frac{a_{i+1} + a_{i+2} + a_{i+3}}{3}, \cdots, \quad (5)$$

$$A_{i+n} = \frac{a_{i+n} + a_{i+(n+1)} + a_{i+(n+2)}}{3}, \cdots (n = 0, 1, 2, \cdots)$$

With this, the average B and the changing ratio C are made as follows.

$$B_i = \frac{A_i + A_{i+1} + \cdots + A_{i+49}}{50}, \quad (6)$$

$$B_{i+1} = \frac{A_{i+1} + A_{i+2} + \cdots + A_{i+50}}{50}, \cdots,$$

$$B_{i+m} = \frac{A_{i+m} + A_{i+(m+1)} + \cdots + A_{i+(m+49)}}{50}, \cdots, (m = 0, 1, 2, \cdots)$$

$$\Delta A_i = A_i - A_{i-1} \quad (7)$$

$$\Delta A_{i+1} = A_{i+1} - A_i$$

$$\Delta A_{i+n} = A_{i+n} - A_{i+(n-1)} \; (n = 0, 1, 2, \cdots)$$

$$C_i = \frac{\Delta A_i + \Delta A_{i+1} + \cdots + \Delta A_{i+19}}{20} \quad (8)$$

$$C_{i+1} = \frac{\Delta A_{i+1} + \Delta A_{i+2} + \cdots + \Delta A_{i+20}}{20}, \cdots,$$

$$C_{i+l} = \frac{\Delta A_{i+l} + \cdots + \Delta A_{i+(l+1)} + \cdots + \Delta A_{i+(l+19)}}{20}, \cdots (l = 0, 1, 2, \cdots)$$

A method as shown in these formulas (5) to (8) is generally called the "moving average". The moving average may be used.

Figure 4:
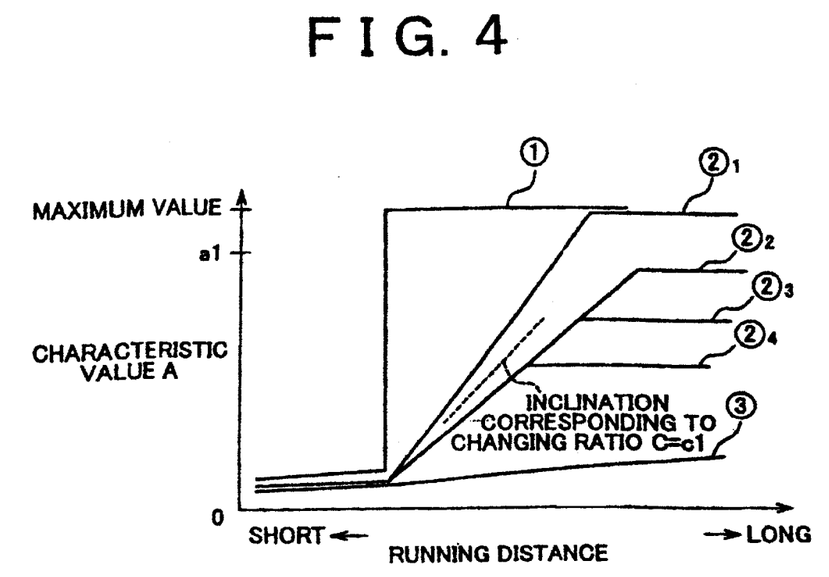
FIG. 4 is a graph showing various deterioration patterns of exhaust emission purifying catalyst and the relation between a running distance and a characteristic value.
Figure 4A:
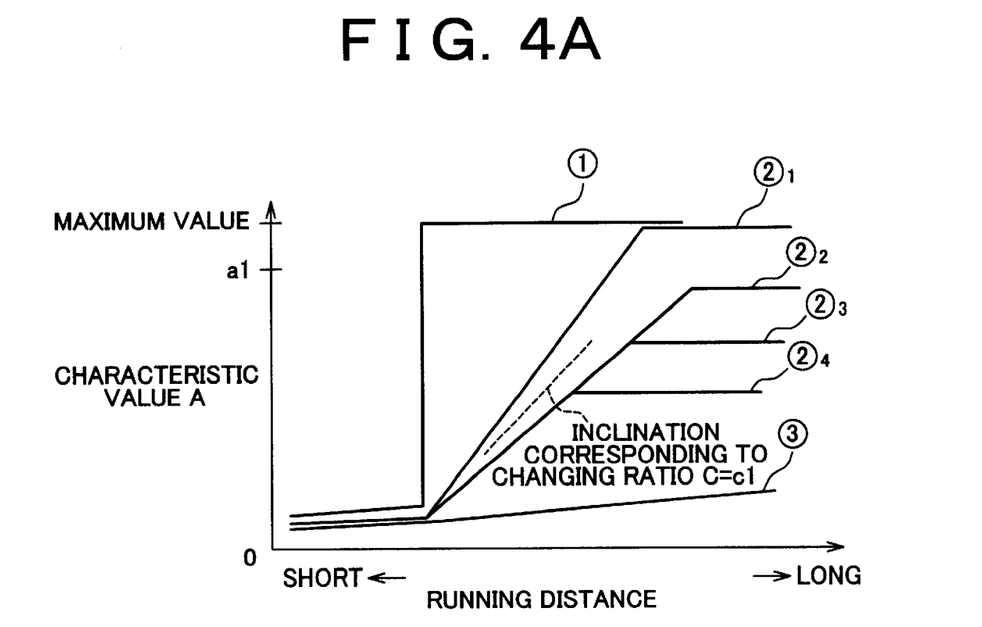
Figure 4B:
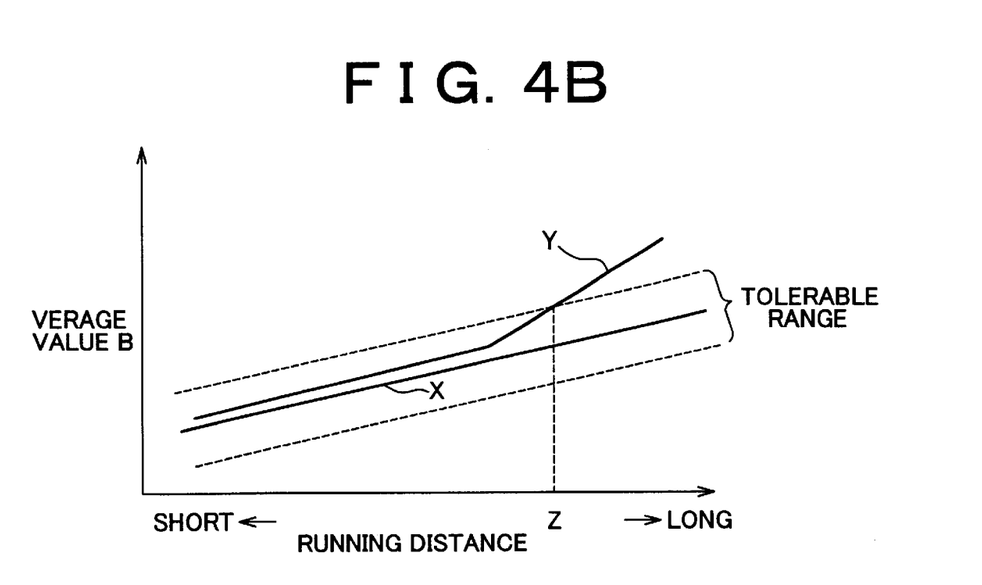

After the above-mentioned characteristic value A, the average B and the changing ratio C are calculated at step 130, it is firstly determined whether the characteristic value A at that point exceeds a predetermined threshold a1 or not (step 140). Here, the characteristic value A being over the predetermined threshold a1 means that a pattern such as ① in FIG. 4 can be detected. In FIG. 4, various deterioration patterns of exhaust emission purifying catalyst 19 other than the pattern ① are shown. The pattern ① shows a case in which the deterioration proceeds at once due to the breakage or the melt-down of the exhaust emission purifying catalyst 19.

Incidentally, a pattern ③ in FIG. 4 is a usual deterioration pattern of the exhaust emission purifying catalyst 19 and a gently proceeding state of the deterioration. Incidentally, the maximum value in FIG. 4 is a value, which the characteristic value A becomes when the exhaust emission purifying catalyst 19 deteriorates completely. In this case where the locus length ratio is employed as the characteristic value A, the locus length ratio becomes 1 when the exhaust emission purifying catalyst 19 deteriorates completely; therefore the maximum value is 1.

Incidentally, the threshold a1 is set on the assumption of a case where the deterioration proceeds considerably, and it is possible to instantly detect only a case where the deterioration proceeds at once. If satisfied at stage 140, it means that the deterioration of the exhaust emission purifying catalyst 19 has intolerably proceeded, and in such a case abnormality (deterioration) determination process is carried out (step 180). On the other hand, if not satisfied at stage 140, it means that the deterioration is not proceeding at once for the time being, and is followed by the next step.

Next, it is determined whether the changing ratio C at this point exceeds a predetermined threshold c1 or not (step 150). The changing ratio C is an average of differences ΔA per unit time of the characteristic values A over 20 times, corresponding to the linear inclination shown as the changes of the characteristics A as shown in FIG. 4. In this case, the changing ratio C exceeding the predetermined threshold c1 means that a pattern such as ②1 in FIG. 4 can be detected. Patterns ②1 to ②4 are such a case that deterioration is due to heat deterioration or the like and the deterioration proceeds more remarkably than the usual deterioration.

Such heat deterioration is caused by the exhaust emission purifying catalyst 19 being exposed to an unusually high temperature, among which, the pattern ②1 is a case of being continuously under a thermal stress and leading to complete deterioration. In the case such as the pattern ②1, when the characteristic value A does not yet reach the threshold a1, the deterioration is not detected at step 140. However, since it is to proceed up to a complete deteriorating state, an early detection is carried out with the changing value C.

That is, if satisfied at step 150, it means that the deterioration of the exhaust emission purifying catalyst 19 has proceeded intolerably or will proceed intolerably in an early state in future, and an abnormality (deterioration) determination process is carried out (step 180). Incidentally, even in the case of the above-mentioned heat deterioration, in the patterns ②2 to ②4 or the like in FIG. 4, the deterioration proceeds, but the proceeding sometimes is not brought as far as to the complete deteriorated state at once. In such a case, as explained below, the determination of the deterioration is accurately carried out with the above-mentioned average B.

Figure 5:
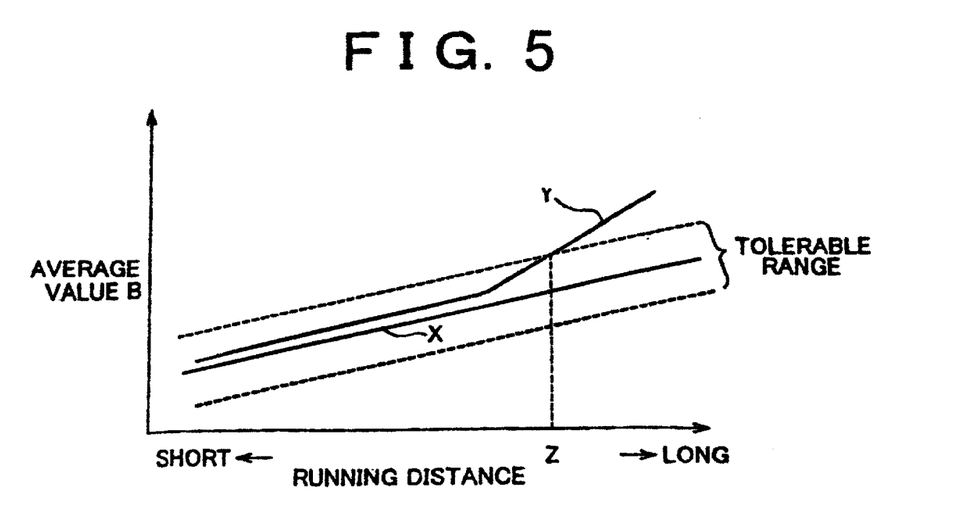
FIG. 5 is a graph showing the relation between a running distance and an average value.

Next, with a map shown in FIG. 5, it is determined if a divergence from a standard of the average B at that point is large or not (that is, the average B is within the range of the standard or not) (step 160). A line X shown in FIG. 5 shows the average B at the time of general deterioration of the exhaust emission purifying catalyst 19 (pattern ③ in FIG. 4) which is a standard of the average B to be detected. And the range in which the average B can become when deterioration of the exhaust emission purifying catalyst 19 proceeds within a tolerance range is set above and below the line X.

If the average B calculated based on the actual detected results is not largely diverged from the standard (the line X), (if within the above-mentioned range), it can be judged that the deterioration of the exhaust emission purifying catalyst 19 is within the tolerable range. On the contrary, if the average B calculated based on the actual detected results is largely diverged from the standard (the line X), (is out of the above-mentioned range), it can be judged that the deterioration of the exhaust emission purifying catalyst 19 is in an intolerable state. FIG. 5 shows an example of the average B actually calculated from the actual detected results as a line Y.

In the example as shown by the line Y, the characteristic value A is in a state as illustrated by the patters ②2 to ②4 of FIG. 4, which shows that the deteriorating state of the exhaust emission purifying catalyst 19 at the point of a running distance Z exceeds the tolerable range, as shown in FIG. 5. In such cases as shown in the patters ②2 to ②4 of FIG. 4, the average B derives the degree of divergence from the standard (line X) to more precisely determine whether the deterioration of the catalyst is tolerable or not based on that. That is, if satisfied at step 160, it means that the deterioration of the exhaust emission purifying catalyst 19 intolerably proceeds, and the abnormality (deterioration) determination process is carried out (step 180). On the other hand, if not satisfied at step 160, it means that the exhaust emission purifying catalyst 19 has not deteriorated, and a process to determine as normal is carried out (step 170).

Incidentally, the calculations of the locus length ratio a, the characteristic value A, the average B, and the changing ratio C are carried out by the ECU 18. That is, the ECU 18 calculates the index characteristic value of catalyst deterioration (characteristic value A) and then the time-lapse changing ratio (changing ratio C) of the index characteristic value of catalyst deterioration. Moreover, the ECU 18 carries out the determination of the deterioration of the exhaust emission purifying catalyst 19 as described below. At the same time, the air-fuel ratio sensors 20, 21 detect exhaust emission air-fuel ratios from oxygen concentrations in exhaust gas at the attached positions.

As mentioned above and shown in the above-mentioned (1) to (4) (or (5) to (8)), the population (the difference ΔA, the characteristic value A which is a basis population of the difference ΔA, and the locus length ratio a, which is a basis population of the characteristic value A) based on which the changing ratio C is calculated is shifted along the time-series. Therefore, even when the characteristic value A happens to be abnormal sporadically, it is possible to prevent incorrect detection from being made thereby. Incidentally, as a case where the population is not shifted along the time-series, calculation of the changing ratio C with all the values to be bases of the calculation of the changing ratio C from the beginning (the number of elements in the population increases rapidly) can be considered. However, changes in the characteristic value A at that point cannot be sufficiently reflected to the changing ratio C by this way.

Further, in this case, the above-mentioned determination with the average B is used at the same time. Thereby, it is possible to positively correspond to various deterioration forms. For example, the pattern① of FIG. 4 shows a completed deterioration, which should be instantly determined as deterioration. In the pattern ②1, the deterioration is not completed; however, it seems to reach a completely deteriorating state soon, and should also be determined as deterioration in an early period of time. This pattern is judged with the above-mentioned changing ratio C. And in the patterns ②2 to ②4, the speed of proceeding is faster than that of an usual deterioration; however, it does not reach the complete deterioration at once and deterioration of these patterns such as the ②2 to②4 is precisely determined with the above-mentioned average B.

Incidentally, the invention is not limited to the above-mentioned embodiment. For instance, although a y-axis of the map shown in FIG. 4 or FIG. 5, or the like, is set to be the running distance in the above-mentioned embodiment, it may be a total amount of gas passing the exhaust emission purifying catalyst 19 instead. Moreover, the calculation methods for the characteristic value A, the average B, and the changing ratio C may be a method other than those shown in the above-mentioned (1) to (4), for example, those shown in (5) to (8) may be employed.

The catalyst deterioration detecting device of the invention calculates an index characteristic value of catalyst deterioration from the outputs of an air-fuel ratio detecting means and a time-lapse changing ratio of the calculated index characteristic value of catalyst deterioration and determines the deterioration of the exhaust emission purifying catalyst based on the calculated time-lapse changing ratio. The invention determines the deterioration of the exhaust emission purifying catalyst based on the time-lapse changing ratio of the index characteristic value of catalyst deterioration instead of carrying out the determination of the deterioration solely by an absolute value of the index characteristic value of catalyst deterioration. Therefore, according to the invention, it is possible to detect the deterioration of the exhaust emission purifying catalyst more precisely and in an earlier period of time corresponding to various deterioration forms of the exhaust emission purifying catalyst.

What is claimed is:

1. A catalyst deterioration detecting device comprising:
   an exhaust emission purifying catalyst arranged on an exhaust passage in an internal combustion engine;
   a first air-fuel ratio sensor arranged upstream of the exhaust emission purifying catalyst;
   a second air-fuel ratio sensor arranged downstream of the exhaust emission purifying catalyst; and
   a controller which calculates an index characteristic value of catalyst deterioration from a first output value of the first air-fuel ratio sensor and a second output value of the second air-fuel ratio sensor, calculates a time-lapse changing ratio of the index characteristic value of catalyst deterioration and determines the deterioration of the exhaust emission purifying catalyst based on the time-lapse changing ratio.

2. The device according to claim 1, wherein, when calculating the time-lapse changing ratio, the controller shifts a population based on which the calculation is performed along the time-series.

3. The device according to claim 1, wherein the characteristic value is a ratio of a length of an output waveform of the second air-fuel ratio sensor over a predetermined time to a length of an output waveform of the first air-fuel ratio sensor over the predetermined time.

4. The device according to claim 1, wherein the characteristic value is a ratio of an area obtained from an output waveform of the second air-fuel ratio sensor over a predetermined time to an area obtained from an output waveform of the first air-fuel ratio sensor over the predetermined time.

5. The device according to claim 1, wherein the characteristic value is a ratio of a frequency of an output waveform of the second air-fuel ratio sensor over a predetermined time to a frequency of an output waveform over the predetermined time of the first air-fuel ratio sensor.

6. A catalyst deterioration detecting method having exhaust emission purifying catalyst arranged on an exhaust passage of an internal combustion engine, a first air-fuel ratio sensor arranged upstream of the exhaust emission purifying catalyst and a second air-fuel ratio sensor arranged downstream of the exhaust emission purifying catalysts comprising steps of:
   calculating an index characteristic value of catalyst deterioration from a first output value of the first air-fuel ratio sensor and a second output value of the second air-fuel ratio sensor;
   calculating a time-lapse changing ratio of the index characteristic value of catalyst deterioration; and
   carrying out the determination of the deterioration of the exhaust emission purifying catalyst based on the time-lapse changing ratio.

7. The detecting method according to claim 6, further comprising a step of carrying out the determination of the deterioration of the exhaust emission purifying catalyst by judging whether the characteristic value is over a predetermined value or not besides the determination of the deterioration based on the time-lapse changing ratio.

8. The detecting method according to claim 6, further comprising a step of carrying out the determination of the deterioration of the exhaust emission purifying catalyst based on an average value of the characteristic values over the predetermined number of calculation times besides the determination of the deterioration based on the time-lapse changing ratio.

9. The detecting method according to claim 6, wherein when calculating the time-lapse changing ratio, a population based on which the calculation is shifted along the time-series.

10. The detecting method according to claim 6, wherein the characteristic value is a ratio of a length of an output waveform of the second air-fuel ratio sensor over a predetermined time to a length of an output waveform of the first air-fuel ratio sensor over the predetermined time.

11. The detecting method according to claim 6, wherein the characteristic value is a ratio of an area obtained from an output waveform of the second air-fuel ratio sensor over a predetermined time to an area obtained from an output waveform of the first air-fuel ratio sensor over the predetermined time.

12. The detecting method according to claim 6, wherein the characteristic value is a ratio of a frequency of an output waveform of the second air-fuel ratio sensor over a predetermined time to a frequency of an output waveform over a predetermined time of the first air-fuel ratio sensor.

* * * * *